Patented Aug. 3, 1926.

1,594,522

UNITED STATES PATENT OFFICE.

MAX HOGE, OF CHICAGO, ILLINOIS, ASSIGNOR TO SEFTON MANUFACTURING CORPORATION, OF CHICAGO, ILLINOIS, A CORPORATION OF NEW YORK.

ADHESIVE MIXTURE.

No Drawing.      Application filed March 17, 1922. Serial No. 544,662.

This invention relates to improvements in adhesive mixtures and its purpose is to provide a new adhesive composition particularly adapted for use on varnished or paraffined surfaces. Ordinary adhesive materials used for connecting paper or wood are often worthless or varnished or paraffined surfaces, but the disadvantages of these prior adhesives are effectually overcome in the present invention.

In preparing the adhesive mixture of the present invention the following ingredients are preferably used in the proportions stated:

| | Parts by weight. |
|---|---|
| Glue | 36 |
| Water | 30 |
| Acetic acid | 9 |
| Wood alcohol | 10 |
| Carbon tetrachlorid | 24 |
| Benzol | 12 |

In addition to the ingredients above named it may be desirable in some instances to use about four parts by weight of glycerin and also small percentages of a resinous substance such as rosin oil and a small quantity of a drying oil such as linseed oil.

While the several ingredients above named are preferably combined in the proportion stated, it will be understood that these proportions may be altered somewhat in the case of each ingredient without destroying the effectiveness of the mixture.

The glue is used in order to provide a strong union between the two surfaces which are to be united and although animal glue is preferably used some other adhesive material such as fish glue, may be substituted in whole or in part for the animal glue. The water serves to dissolve the glue and in preparing the mixture the glue may first be allowed to stand in the water until it is thoroughly softened, after which heat may be applied before adding the other ingredients, or the glue may be given any other suitable preliminary treatment known to the art.

The acetic acid serves to render the glue more soluble, especially when cold, but other acids which affect glue in a similar manner may be substituted in whole or in part without destroying the effectiveness of the mixture. Formic acid is one example of an equivalent acid.

The carbon tetrachlorid is used for its solvent action upon the varnished or paraffined coating of the materials to be connected and also for its fire retardant properties. Other substitutes possessing fire retardant properties may be substituted in whole or in part for the carbon tetrachlorid, one such other substance being tetrachloroethane.

The wood alcohol is used for its solvent action, particularly its solvent action on water and benzol, but some other liquid, such as acetone, which possesses similar solvent properties may be substituted in whole or in part for the wood alcohol, without destroying the effectiveness of the mixture.

The benzol serves as a solvent for varnish, paraffin wax and similar substances, but some other liquids possessing similar solvent properties, for example turpentine, may be substituted in whole or in part for the benzol.

It may be desirable in some instances to use, in addition to the ingredients combined substantially in the proportions above stated, about four parts by weight, of glycerin or some other hygroscopic substance which because of its water absorptive qualities gives a more flexible film without destroying the effectiveness of the mixture. One example of another suitable hygroscopic substance is calcium-chlorid. In many cases the effectiveness of the adhesive mixture is increased by adding a small quantity of rosin oil or other non-brittle resinous substance in order to provide a more flexible film and in some instances also it may be desirable to use about five parts by weight of a drying oil such as linseed oil, in addition to the other ingredients of the mixture, as hereinbefore described.

Although certain ingredients have been particularly described and these ingredients have been set out as being preferably combined in certain portions it will be understood that both the ingredients and the proportions thereof may be altered without departing from the scope of the invention as defined in the appended claims.

I claim:

1. An adhesive mixture consisting of glue, water and acetic acid together with a mixture of volatile solvents consisting of wood alcohol, carbon tetrachloride and benzol.

2. An adhesive substance consisting of by weight 36 parts of glue, 30 parts of water, 9 parts acetic acid, 10 parts wood alcohol, 24 parts of carbon tetrachlorid and 12 parts of benzol.

3. An adhesive substance consisting of by weight 36 parts of glue, 30 parts of water, 9 parts acetic acid, 10 parts wood alcohol, 24 parts of carbon tetrachlorid, 12 parts of benzol, 4 parts of glycerin, and 5 parts linseed oil.

MAX HOGE.